United States Patent
Nagao et al.

(10) Patent No.: US 10,911,653 B2
(45) Date of Patent: Feb. 2, 2021

(54) OPTICAL APPARATUS

(71) Applicant: CANON KABUSHIKI KAISHA, Tokyo (JP)

(72) Inventors: Yuki Nagao, Utsunomiya (JP); Yasuhiro Hatakeyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 16/218,289

(22) Filed: Dec. 12, 2018

(65) Prior Publication Data

US 2019/0191065 A1    Jun. 20, 2019

(30) Foreign Application Priority Data

Dec. 14, 2017    (JP) ................................ 2017-240007

(51) Int. Cl.
H04N 5/225    (2006.01)
H04N 5/232    (2006.01)

(52) U.S. Cl.
CPC ....... *H04N 5/2254* (2013.01); *H04N 5/23209* (2013.01); *H04N 5/23212* (2013.01); *H04N 5/23216* (2013.01); *H04N 5/23296* (2013.01)

(58) Field of Classification Search
CPC ............. H04N 5/2254; H04N 5/23209; H04N 5/23216; H04N 5/23296; H04N 5/23212
See application file for complete search history.

(56) References Cited

U.S. PATENT DOCUMENTS

| | | | |
|---|---|---|---|
| 9,140,960 B2 | 9/2015 | Cho | |
| 9,791,660 B2 | 10/2017 | Takeshita | |
| 2007/0285528 A1* | 12/2007 | Mise | H04N 5/23212 348/222.1 |
| 2013/0021687 A1* | 1/2013 | Santo | G02B 7/102 359/827 |
| 2013/0271860 A1* | 10/2013 | Arakawa | G02B 7/04 359/823 |
| 2014/0240465 A1* | 8/2014 | Kawase | G03B 3/00 348/47 |
| 2015/0331221 A1* | 11/2015 | Koiwai | G02B 7/10 359/701 |

FOREIGN PATENT DOCUMENTS

JP    2014-178644 A    9/2014

* cited by examiner

*Primary Examiner* — Yogesh K Aggarwal
(74) *Attorney, Agent, or Firm* — Canon U.S.A., Inc. IP Division (57) ABSTRACT

An optical apparatus including a first operation portion operable to adjust a first optical parameter, a second operation portion operable to adjust the first optical parameter and a second optical parameter different from the first optical parameter. In the optical apparatus, an adjustment amount of the first optical parameter per unit rotation angle of the first operation portion and an adjustment amount of the first optical parameter per unit rotation angle of the second operation portion are different from each other.

12 Claims, 4 Drawing Sheets

OPTICAL APPARATUS

BACKGROUND

Field of the Disclosure

The present disclosure relates to an optical apparatus such as a digital camera, a video camera, or an interchangeable lens.

Description of the Related Art

A lens apparatus described in U.S. Pat. No. 9,140,960 is known as an optical apparatus in which, in addition to a focus ring for driving a focus lens unit and a zoom ring for driving a zoom lens unit, a third operation ring is provided in a lens barrel portion. A function selected from a plurality of functions, such as a function of changing an imaging mode and an electronic zoom function (digital zoom function), can be allocated to the third operation ring provided in the lens apparatus described in U.S. Pat. No. 9,140,960.

As described above, in U.S. Pat. No. 9,140,960, when the electronic zoom function is allocated to the third operation ring, zooming can be performed using a zoom ring or the third operation ring. However, there is a difference in that one is optical zooming and the other is electronic zooming.

In a case in which there is only a single operation ring that can exert a certain function, time is needed to operate the operation ring cautiously to perform fine adjustment after greatly rotating the single operation ring to perform coarse adjustment. When attempting to finish the operation of the operation ring in a short time, since there is little time to perform fine adjustment while cautiously operating the operation ring, one cannot accurately perform the target amount of adjustment of the certain optical parameter.

A configuration in which two operation rings, which can exert the same function, are selectively used for different purposes, that is, for coarse adjustment and for fine adjustment, will be discussed. In such a configuration, a predetermined optical operation, such as focusing and zooming, can be performed accurately and in a short time by operating the ring for fine adjustment after operating the ring for coarse adjustment. However, U.S. Pat. No. 9,140,960 does not disclose a configuration in which the two operation rings are selectively used for different purposes such as for coarse adjustment and for fine adjustment.

SUMMARY

Accordingly, the present disclosure provides an optical apparatus capable of achieving both accuracy in adjusting the optical parameter and shortening the adjustment time.

An aspect of an optical apparatus according to the present invention includes a first operation portion operable to adjust a first optical parameter, a second operation portion operable to adjust the first optical parameter and a second optical parameter different from the first optical parameter, in which an adjustment amount of the first optical parameter per unit rotation angle of the first operation portion and an adjustment amount of the first optical parameter per unit rotation angle of the second operation portion are different from each other.

Further features of the present invention will become apparent from the following description of exemplary embodiments with reference to the attached drawings.

DESCRIPTION OF THE EMBODIMENTS

First Embodiment

Configuration of Camera System

Figure 1:
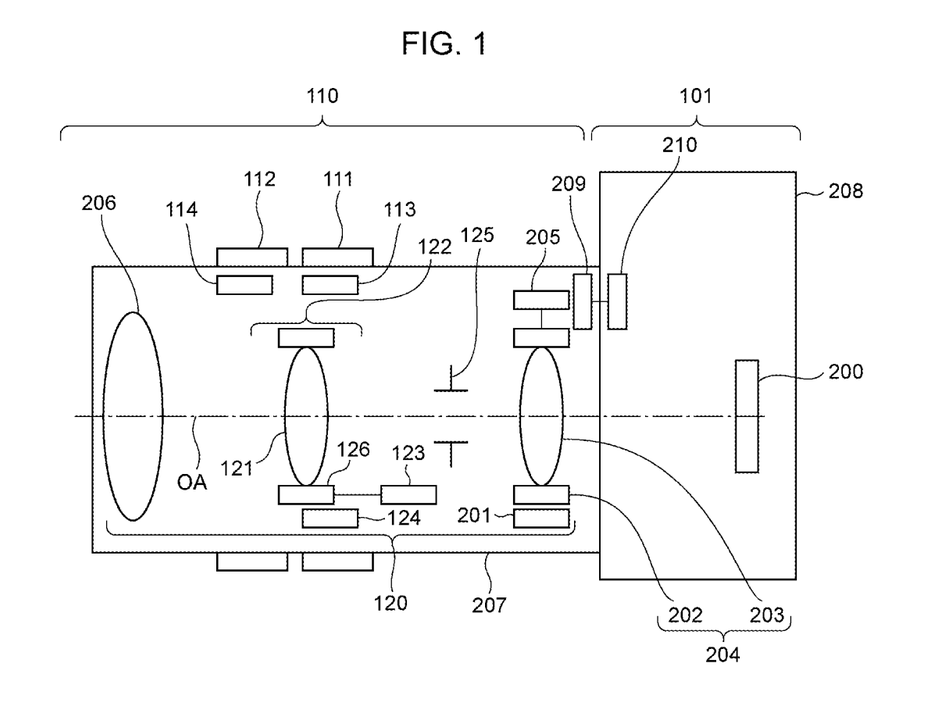
FIG. 1 is a block diagram illustrating a configuration of an optical apparatus according to embodiments.

Referring to FIG. 1, configurations of camera systems (imaging apparatuses) according to embodiments of the present disclosure will be described. The camera system herein is a collective term for a lens apparatus (an interchangeable lens) 110, and a camera body (a body portion) 101 capable of supporting the lens apparatus 110. An optical apparatus in each embodiment of the present disclosure is a term denoting the lens apparatus 110 itself as a single member as well as the camera system.

Configuration of Camera Body 101

The camera body 101 is capable of supporting the lens apparatus 110, and includes therein an image pickup element 200, and a control portion 210 capable of communicating with a control portion 209 provided in the lens apparatus 110 described later. The lens apparatus 110 may be detachable to or undetachable from the camera body 101.

Configuration of Lens Apparatus 110

The lens apparatus 110 includes a lens barrel 207, an image pickup optical system (an image forming optical system) 120 provided inside the lens barrel 207, and an aperture unit 125 that adjusts the light amount of the imaging light.

The image pickup optical system 120 includes a fixed lens 206 that is immobile in a direction (hereinafter, referred to as an optical axis direction) of an optical axis OA of the image pickup optical system 120, a focus lens 121, and a zoom lens 203. Focus adjustment is performed by the focus lens 121 moving in the optical axis direction, and focal length adjustment (a change in magnification) is performed by the zoom lens 203 moving in the optical axis direction.

The focus lens 121 is supported by a focus lens barrel 126. Reference numeral 122 in FIG. 1 is a focus lens unit including the focus lens 121 and the focus lens barrel 126. The focus lens unit 122 is movable in the optical axis direction with a driving mechanism having a focus actuator 123 as a driving source. A moving amount of the focus lens unit 122 is detectable with a focus lens moving amount detection mechanism. The focus lens moving amount detection mechanism includes a scale (not shown) on which a light and dark pattern is printed and that is pasted on the focus lens barrel 126 side, and a position sensor 124 that is an optical sensor including a light projecting element and a light receiving element provided in a fixed member (not shown).

Note that the configuration of the focus lens moving amount detection mechanism is not limited to the configuration including the scale and the position sensor 124 described above. For example, in a case in which the focus actuator 123 is a stepping motor, the moving amount of the focus lens unit 122 can be detected by a driving pulse count of the stepping motor. In the present embodiment and the embodiments described later, regardless of the configuration of the focus lens moving amount detection mechanism, the minimum unit in which the moving amount can be detected is defined as a minimum control amount.

The zoom lens 203 is supported by a zoom lens barrel 202. In FIG. 1, reference numeral 204 is a zoom lens unit that includes the zoom lens 203 and the zoom lens barrel 202. The zoom lens unit 204 is drivable in the optical axis direction with a driving mechanism having a zoom actuator 205 as a driving source. The moving amount of the zoom lens unit 204 is detectable with the zoom lens moving amount detection mechanism. The zoom lens moving amount detection mechanism includes a scale (not shown) on which a light and dark pattern is printed and that is pasted on the zoom lens barrel 202 side, and a position sensor 201 that is an optical sensor including a light projecting element and a light receiving element provided in the fixed member (not shown). Similar to the configuration of the focus lens moving amount detection mechanism described above, the configuration of the zoom lens moving amount detection mechanism is not limited to that using an optical sensor. Furthermore, the mechanism that drives the zoom lens unit 204 in the optical axis direction is not limited to a configuration in which the zoom actuator 205 is the driving source. The mechanism may be one that moves the zoom lens unit 204 in the optical axis direction by rotating a cam barrel mechanically connected to the operation ring provided on an outer circumference of the lens barrel 207. Furthermore, the lens apparatus 110 may not include the zoom lens unit 204. In other words, the lens apparatus 110 may be a single-focus lens apparatus.

A first rotating ring (a first operation ring, a first operation portion) 111 and a second rotating ring (a second operation ring, a second operation portion) 112 are provided on the outer circumference of the lens barrel 207. The first rotating ring 111 and the second rotating ring 112 are ring-shaped operation members rotatable about the optical axis OA.

Function of First Rotating Ring 111

The first rotating ring 111 is supported by the lens apparatus 110 so as to be limitlessly turnable about the optical axis OA in a clockwise direction (hereinafter, referred to as direction A) and also in a counterclockwise direction (hereinafter, referred to as direction B). When the first rotating ring 111 is turned in direction A, a signal (a single pulse) indicating that the first rotating ring 111 has turned in direction A is output each time the first rotating ring 111 turns by a predetermined and fixed angle α and is transmitted to the control portion 209 provided inside the lens apparatus 110. The first rotating ring 111 is an electronic operation ring.

When the first rotating ring 111 is turned in direction B, a signal (a single pulse) indicating that the first rotating ring 111 has turned in direction B is output each time the first rotating ring 111 turns by the predetermined and fixed unit angle α (the same angle as that in the case of direction A) and is transmitted to the control portion 209. In other words, for example, when the first rotating ring 111 is turned in direction A by angle 3α, three signals (three pulses) indicating that the first rotating ring 111 has turned in direction A is output and is transmitted to the control portion 209.

The control portion 209 can determine the angle (the amount of rotation) at which the first rotating ring 111 has turned in direction A by counting the number of outputs of the signal (the number of pulses) indicating that the first rotating ring 111 has turned in direction A. Similarly, the control portion 209 can determine the angle (the amount of rotation) at which the first rotating ring 111 has turned in direction B by counting the number of outputs of the signal indicating that the first rotating ring 111 has turned in direction B.

The control portion 209 performs a predetermined process according to the angle and direction in which the first rotating ring 111 has turned. As an example of the process, in the present embodiment, the control portion 209 drives the focus actuator 123 according to the angle at which the first rotating ring 111 has turned in direction A so that the focus lens unit 122 moves to a position where the focal point is set to a closer object. As the angle of the rotating operation becomes larger and the number of output pulses becomes larger, the moving amount of the focus lens unit 122 becomes larger. Furthermore, the control portion 209 drives the focus actuator 123 according to the angle at which the first rotating ring 111 has turned in direction B so that the focus lens unit 122 moves to a position where the focal point is set to an object farther away.

Function of Second Rotating Ring 112

Similar to the first rotating ring 111, the second rotating ring 112 is supported by the lens barrel so as to be limitlessly turnable about the optical axis OA in direction A and in direction B. The second rotating ring 112 is located on the magnification conjugate side (an object side) with respect to the first rotating ring 111. Compared with the first rotating ring 111, the second rotating ring 112 is supported at a position that is farther away from the camera body 101. The second rotating ring 112 and the first rotating ring 111 are disposed so as to be both concentric with the optical axis OA and aligned in the optical axis direction.

When the second rotating ring 112 is turned in direction A, a signal indicating that the second rotating ring 112 has turned in direction A is output each time the second rotating ring 112 turns by a predetermined and fixed angle β and is transmitted to the control portion 209. When the second rotating ring 112 is turned in direction B, a signal indicating that the second rotating ring 112 has turned in direction B is output each time the second rotating ring 112 turns by a predetermined and fixed angle β and is transmitted to the control portion 209. The second rotating ring 112 is an electronic operation ring.

The control portion 209 can determine the angle at which the second rotating ring 112 has turned in direction A by counting the number of outputs of the signal indicating that the second rotating ring 112 has turned in direction A. Similarly, the control portion 209 can determine the angle at which the second rotating ring 112 has turned in direction B by counting the number of outputs of the signal indicating that the second rotating ring 112 has turned in direction B.

The control portion 209 performs a predetermined process according to the angle and direction in which the second rotating ring 112 has turned. As an example of the process, in the present embodiment, the control portion 209 drives the focus actuator 123 according to the angle at which the second rotating ring 112 has turned in direction A so that the focus lens unit 122 moves to a position where the focal point is set to a closer object. Furthermore, the control portion 209 drives the focus actuator 123 according to the angle at which the second rotating ring 112 has turned in direction B so that the focus lens unit 122 moves to a position where the focal point is set to an object farther away. Configurations of first detection portion 113 and second detection portion 114

The lens apparatus 110 includes a first detection portion 113 that detects the rotation direction and the amount of rotation (an operation direction and a manipulated variable) of the first rotating ring 111. The lens apparatus 110 further includes a second detection portion 114 that detects the rotation direction and the amount of rotation (the operation direction and the manipulated variable) of the second rotating ring 112. Referring to FIGS. 2A to 2D and FIG. 3, configurations of the first detection portion 113 and the second detection portion 114 will be described.

Figure 2A:
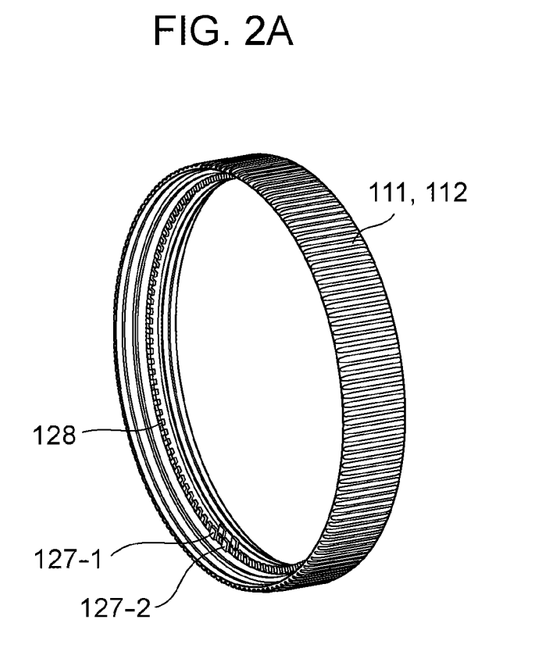
FIGS. 2A to 2D are diagrams illustrating configurations of a rotating ring and a detection portion according to the embodiments.
Figure 2B:
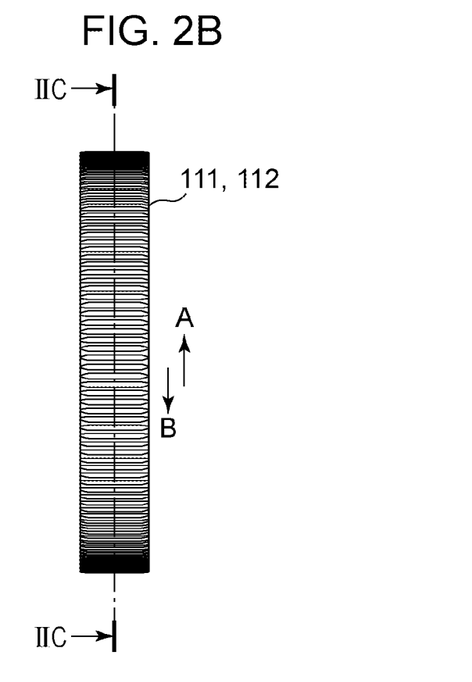
Figure 2C:
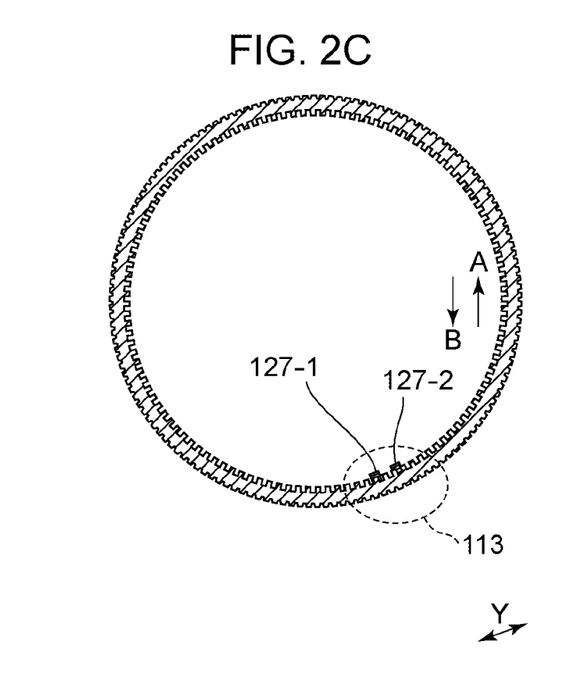
Figure 2D:
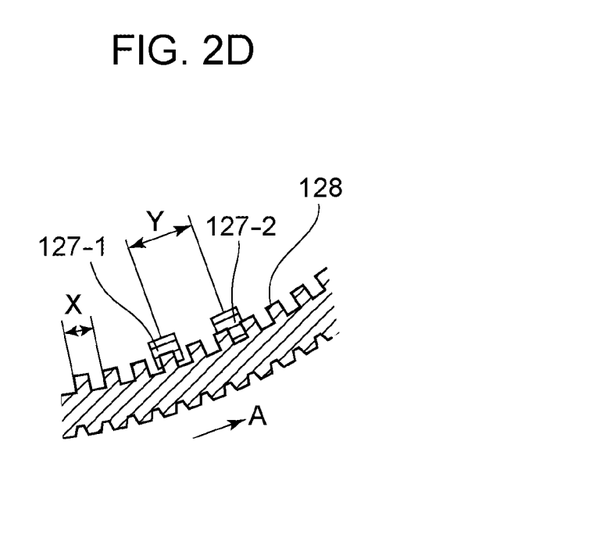
Figure 3:
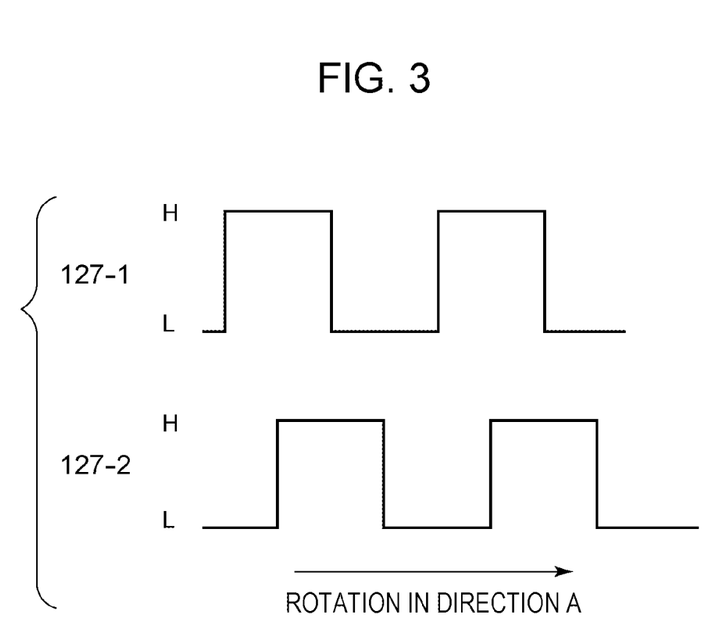
FIG. 3 is a diagram illustrating waveforms of signals output from a detection system of the rotating ring, according to the embodiments.

The first detection portion 113 and the second detection portion 114 each includes photointerrupters 127-1 and 127-2 that are detection elements and comb teeth 128 illustrated in FIGS. 2A, 2C, and 2D. FIG. 2A is a perspective view of the photointerrupters 127-1 and 127-2 and the comb teeth 128. FIG. 2C is a cross-sectional view of the first rotating ring 111 or the second rotating ring 112 taken along line IIC-IIC in FIG. 2B. FIG. 2D is an enlarged view of the photointerrupters 127-1 and 127-2, and the comb teeth 128 in FIG. 2C. As illustrated in FIG. 2D, a projection-recess pitch X of the comb teeth 128 and an interval Y in which the photointerrupters 127-1 and 127-2 are arranged are set to have a relationship offset to each other by one-fourth of a period in order to detect the direction of rotation. FIG. 3 is a diagram illustrating the changes in the outputs from the two photointerrupters 127-1 and 127-2 caused by the movement of the comb teeth 128 with the turning of the rotating ring 111 in direction A illustrated in FIG. 2D. In FIG. 3, reference sign L denotes low, and reference sign H denotes high.

Each time the first rotating ring 111 rotates by unit angle (unit rotation angle) α, the outputs from the two photointerrupters change in each pulse and return in a cycle in the following manner: (L, L), (H, L), (H, H), (L, H), and (L, L). When the outputs of the two photointerrupters starting with (L, L) change to (H, L), (H, H). (L, H), and (L, L), it is determined that the first rotating ring 111 has turned in direction A by four times the unit angle α. Conversely, when the output changes to (L, H), (H, H), (H, L), and (L, L) and returns to (L, L) at the start in a cycle, it is determined that the first rotating ring 111 has turned by four times the unit angle α in direction B that is a direction opposite to direction A. The unit angle α is equivalent to one fourth of the comb teeth pitch X. With such a configuration, the amount of rotation and the rotation direction of the first rotating ring 111 can be detected.

Note that detections of the amount of rotation and the rotation direction of the second rotating ring 112 are performed with a method similar to that of the first rotating ring 111.

The unit angle α of the first rotating ring 111 and the unit angle β of the second rotating ring 112 can be determined by the projection-recess pitches of the comb teeth formed integrally with the first rotating ring and the second rotating ring 112. For example, in the present embodiment, the projection-recess pitches of the comb teeth formed in the first rotating ring 111 and the second rotating ring 112 are set the same. Accordingly, when the photointerrupters of the first rotating ring 111 and the photointerrupters of the second rotating ring 112 for detecting rotation are located at positions where the distances from the optical axis are the same, the unit angle α and the unit angle β are the same.

Note that the configurations of the first detection portion 113 and the second detection portion 114 are not limited to the configurations described above. For example, an electric board for detection may be provided on an inner diameter of each of the first rotating ring 111 and the second rotating ring 112, and pulses may be detected with a method in which the electric boards are in physical and sliding contact with conducting brushes. Furthermore, the configuration of the first detection portion 113 and that of the second detection portion 114 do not have to be the same.

Selectively Using Two Operation Ring for Different Purposes

In the present embodiment, the focus lens 121 are moveable in the optical axis direction in both cases in which the first rotating ring and the second rotating ring 112 are rotated about the optical axis. More specifically, the first rotating ring 111 only has a function as a focus ring that moves the focus lens 121 in the optical axis direction. On the other hand, the second rotating ring 112 can be made to allocate, other than the function as a focus ring, a function as a zoom ring that moves the zoom lens 203 in the optical axis direction, and a function as an aperture ring that changes an aperture diameter of an aperture 125. In other words, the function in which the second rotating ring 112 implement can be changed in the lens apparatus 110.

In the present embodiment, the moving amount of the focus lens 121 when the first rotating ring 111 is rotated about the optical axis by unit angle α and the moving amount of the focus lens 121 when the second rotating ring 112 is rotated about the optical axis by unit angle β are different from each other.

Reference sign X is the moving amount of the focus lens 121 when the first rotating ring 111 is rotated about the optical axis by unit angle α, and reference sign Y is the moving amount of the focus lens 121 when the second rotating ring 112 is rotated about the optical axis by unit angle β. In such a case, it can be conceived that X and Y are different from each other in the present embodiment.

For example, when the first rotating ring 111 is rotated about the optical axis by unit angle α (with a rotating operation of a single pulse), the focus actuator 123 is driven the minimum control amount. By so doing, the moving amount of the focus lens 121 can be a small amount, small to the controllable limit, which will allow focusing to be performed in an exact manner. In other words, the first rotating ring 111 can be used as a focus ring for fine adjustment.

On the other hand, when the second rotating ring 112 is rotated about the optical axis by unit angle β, the focus actuator 123 is driven double or triple the minimum control amount. In other words, the second rotating ring 112 can be uses as a focus ring for coarse adjustment.

Effects That Can be Obtained With Configuration of Present Embodiment

A case in which the operation of the rotating ring (adjustment of the optical parameter) needs to be carried out in a short time, such as when taking an image of an object that is about to move will be discussed. For example, in a case in which there is only one operation ring that can implement a function of a focus ring, the sensitivity of the operation ring is set to a sensitivity that allows fine adjustment. In such a case, the focus lens moving amount per unit rotation angle of the operation ring needs to be small. Accordingly, fine adjustment needs to be performed after coarse adjustment has been performed by greatly moving the operation ring. As a result, the time needed to achieve the target in-focus state becomes long. In such a case, in the optical apparatus described in the present embodiment, adjustment of the optical parameter can be performed accurately in a short time by performing fine adjustment by operating the ring for fine adjustment after performing coarse adjustment by operating the ring for coarse adjustment. In other words, the optical apparatus described in the present embodiment can achieve both accurate adjustment of the optical parameter and shortening of the adjustment time.

As described above, the lens apparatus 110 which is an optical apparatus described in the present embodiment includes the first rotating ring 111 for fine adjustment and the second rotating ring 112 for coarse adjustment. Furthermore, as described above, the first rotating ring 111 is a ring that functions as a focus ring, and is the first operation portion capable of adjusting the position (a first optical parameter) of the focus lens 121. Furthermore, the second rotating ring 112 is a ring that functions as a focus ring, a zoom ring, and an aperture ring. In other words, the second rotating ring 112 is the second operation portion capable of adjusting the position of the focus lens 121, the position of the zoom lens 203 other than the above, the aperture diameter (a second optical parameter) of the aperture unit 125, and the like.

Furthermore, in the lens apparatus 110, the adjustment amount of the first optical parameter per the unit rotation angle of the first rotating ring 111, and the adjustment amount of the first optical parameter per the unit rotation angle of the second rotating ring 112 are different from each other.

By having the lens apparatus 110 be provided with the configuration described above, as described above, adjustment of the optical parameter can be performed in a shorter time than before. Furthermore, since the first rotating ring 111 and the second rotating ring 112 are located at positions that are different from each other in the optical axis OA direction, one only needs to move the hand when, after operating one of the rotating rings, operating the other rotating ring. Furthermore, since the first rotating ring 111 and the second rotating ring 112 have similar configurations in which the first rotating ring 111 and the second rotating ring 112 rotate about the optical axis OA, in the present embodiment, the user only needs to carry out the rotating operation of an operation ring which has been performed until then, confusion less likely happens to the user.

In the present embodiment, when the first rotating ring 111 is rotated about the optical axis by unit angle α, the focus actuator 123 is driven the minimum control amount. Furthermore, when the second rotating ring 112 is rotated about the optical axis by unit angle β, the focus actuator 123 is driven double or triple the minimum control amount. Moreover, an outer diameter of the first rotating ring 111 and an outer diameter of the second rotating ring 112 are the same, and the detection pitches of the comb teeth for detecting the amount of rotation in each of the two rotating rings are the same. As a result, the unit angles α and β are the same. In other words, when obtaining the same moving amount of the focus lens 121, the manipulated variable regarding the rotation of the first rotating ring 111 is larger than the manipulated variable regarding the rotation of the second rotating ring 112. Note that the manipulated variable regarding the rotation is defined as a moving distance of the outermost diameter portion of each rotating ring when rotated. Accordingly, in a case in which the detection pitches of the comb teeth are the same, the operation angle (the unit rotation angle) to output a single pulse becomes smaller when the outermost diameter of the rotating ring becomes larger.

Modification Examples

Hereinafter, modification examples of the present embodiment will be described.

In the lens apparatus 110 described above, the outer diameters of the first rotating ring 111 and the second rotating ring 112 are the same; however, the outer diameters of the two may be different from each other. More specifically, the outer diameter of the second rotating ring 112 may be larger than the outer diameter of the first rotating ring 111. In such a case, the positions of the photointerrupters 127-1 and 127-2 of the second detection portion 114 are farther away from the optical axis OA when compared with those of the first detection portion 113. Accordingly, when the detection pitches of the comb teeth are the same, the unit rotation angle β of the second rotating ring 112 is smaller than the unit rotation angle α of the first rotating ring 111.

As described above, by having the outer diameters of the two rotating rings be different from each other, the difference between the first rotating ring 111 and the second rotating ring 112 becomes more apparent. Furthermore, the thicknesses of the two rotating rings in the optical axis OA direction may be different from each other. Furthermore, the surface patterns or the surface materials of the first rotating ring 111 and the second rotating ring 112 may be different from each other. The surface patterns herein denote the surface shapes, the surface colors, and the like.

Figure 4A:
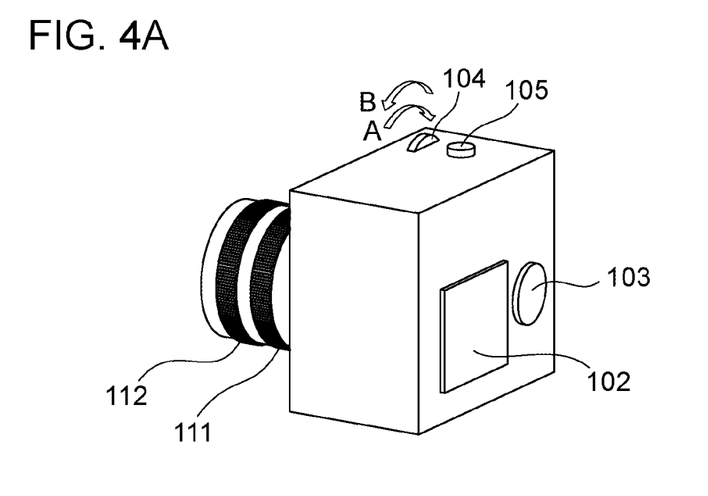
FIGS. 4A to 4C are external diagrams of the optical apparatus according to the embodiments.
Figure 4B:
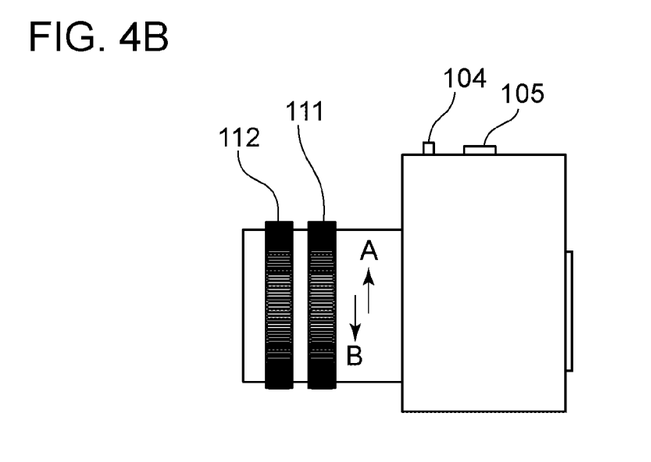
Figure 4C:
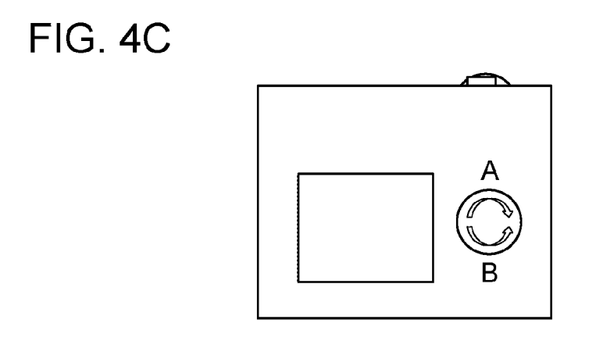

In the description described above, the first rotating ring 111 is a focus ring, and the second rotating ring 112 is a custom ring to which a plurality of functions can be allocated. A function of a focus ring is allocated to the second rotating ring 112. The change in the function allocated to the second rotating ring 112 may be made with a selector (a function changing portion) provided in the camera body 101 or in the lens apparatus 110. The change in the function allocated to the second rotating ring 112 may be made through a menu displayed on a display screen provided in the camera body 101 or in the lens apparatus 110. An operation dial 104 in the vicinity of a shutter button 105 provided in the camera body 101 or an operation dial 103 in the vicinity of a liquid crystal display screen 102 that are illustrated in FIGS. 4A, 4B, and 4C may be used as the selector described above. The operation dials 104 and 103 are rotatable in both the clockwise direction and the counterclockwise direction. The function allocated to the second rotating ring 112 may be changed by rotating the operation dial 104 or 103. In such a case, the present function allocated to the second rotating ring 112 may be made to be displayed on the liquid crystal display screen 102.

The concept of the present embodiment can be applied to a case in which the first rotating ring 111 is configured not as a focus ring but as a zoom ring, and in which a function of a zoom ring is allocated to the second rotating ring 112. In more detail, the lens apparatus 110 may be configured so that the moving amount of the zoom lens 203 per unit rotation angle of the first rotating ring 111 and the moving amount of the zoom lens 203 per unit rotation angle of the second rotating ring 112 may be different from each other. With such a configuration, focusing can be performed by allowing a function of a focus ring to be allocated to the second rotating ring 112.

The first rotating ring 111 may be configured as a focus ring, and a third rotating ring serving as a zoom ring may be added to the lens apparatus 110. In such a configuration, it is only sufficient that the moving amount of the zoom lens 203 per unit rotation angle of the third rotating ring, and the moving amount of the zoom lens 203 per unit rotation angle of the second rotating ring 112 are set different from each other.

Similar to the second rotating ring 112, the first rotating ring 111 may also be configured as a custom ring capable of allocating a plurality of functions. In such a configuration, the first rotating ring 111 and the second rotating ring 112 can be selectively used for different purposes, such as the first rotating ring 111 being used as an aperture ring for fine adjustment, and the second rotating ring 112 being used as an aperture ring for coarse adjustment.

While the projection-recess pitches of the comb teeth formed in the first rotating ring 111 and that in the second rotating ring 112 are set the same, the projection-recess pitches may differ between the two rotating rings. In such a case, only the relationship between the unit angle α and the unit angle β differ, and an effect that is similar to the effect in the case in which the projection-recess pitches are the same can be obtained.

In the present modification example, the settings may be opposite to the settings of the first embodiment. In other words, when obtaining the same moving amount of the focus lens 121, the manipulated variable regarding the rotation of the second rotating ring 112 may be set larger than the manipulated variable regarding the rotation of the first rotating ring 111. In other words, the second rotating ring 112 may be used as a ring for fine adjustment, and the first rotating ring 111 may be used as a ring for coarse adjustment.

The first optical parameter and the second optical parameter described above are either the position of the zoom lens unit, the position of the focus lens unit, or the aperture diameter of the aperture unit. However, the first optical parameter and the second optical parameter are not limited to the parameters described above. For example, the first and second optical parameters may be the focal length of the image pickup optical system 120, the angle of view in image taking (magnification), ISO sensitivity, a shutter speed, and the like. Assume, for example, that the first rotating ring 111 is an operation ring for electronic zooming and the second rotating ring 112 is an operation ring for optical zooming. In such a case, it is only sufficient that the angle-of-view changing amount (the magnification changing amount) when the first rotating ring 111 is operated by the unit rotation angle and the angle-of-view changing amount (the magnification changing amount) when the second rotating ring 112 is operated by the unit rotation angle are different from each other. The angle-of-view changing amount may be understood as a changing amount of the size of an object, which is displayed on the liquid crystal display screen 102, in the liquid crystal display screen 102.

Note that in the first embodiment described above, photointerrupters having the same minimum resolution are used in the first rotating ring 111 and the second rotating ring 112. However, photointerrupters that have different minimum resolutions may be used in the first rotating ring 111 and the second rotating ring 112. The minimum resolution herein is a moving amount along the circumference when a single pulse is detected. Between the first rotating ring 111 and the second rotating ring 112, a photointerrupter having a higher minimum resolution may be installed in the operation ring for fine adjustment, or a photointerrupter having a higher minimum resolution may be installed in the operation ring for coarse adjustment. It is desirable that the photointerrupter that has a higher minimum resolution is installed in the operation ring for coarse adjustment since, for example, the focus lens can be moved more greatly with a small manipulated variable and the desired photographing condition can be created in a shorter time.

Second Embodiment

A second embodiment of the present disclosure will be described next. Different from the first embodiment described above, in the present embodiment, the user can change the adjustment amount of the optical parameter per unit rotation angle of the rotating ring, and a minimum manipulated variable of the rotating ring in which the adjustment of the optical parameter is to be started.

In more detail, the camera body 101 is set to, from an imaging mode, a mode that changes the adjustment amount of the optical parameter per unit rotation angle of the rotating ring, and a minimum rotation amount of the rotating ring that starts the adjustment of the optical parameter. The above mode transition is performed when the user operates the operation dial 104 or 103 illustrated in FIGS. 4A, 4B, and 4C. For example, a setting can be set so that the focus lens 121 do not move in the optical axis direction when the first rotating ring 111 rotates by unit rotation angle α but will move in the optical axis direction when rotated by 3α. In such a case, the minimum rotation amount is 3α. By allowing such a setting to be set, the focus lens 121 is only moved slightly against a predetermined manipulated variable regarding the rotation; accordingly, focusing can be performed readily.

In the first embodiment described above, the focus actuator 123 is driven double or triple the minimum control amount when the second rotating ring 112 is rotated about the optical axis by unit angle β. Conversely, in the present embodiment, the setting can be changed so that the focus actuator 123 is driven five times the minimum control amount when the second rotating ring 112 is rotated about the optical axis by unit angle β, for example. As a result, compared with the first embodiment described above, the focus lens 121 can be moved greatly with a smaller rotation angle of the second rotating ring 112; accordingly, the focus lens 121 can be set to the target position in a shorter time. In other words, in the present embodiment as well, both an increase in speed and accuracy in focusing can be achieved by using the first rotating ring 111 and the second rotating ring 112 in combination.

Third Embodiment

In the first and second embodiments described above, both the first rotating ring 111 and the second rotating ring 112 are specified so as to rotate smoothly without any change in the rotation resistance to the extent possible during the rotating operation. Conversely, in the present embodiment, the lens apparatus 110 includes a mechanism (a click mechanism) that adds a click feeling during the rotating operation in at least either one of the first rotating ring 111 and the second rotating ring 112. The click mechanism may be configured in any way as long as an actuator using magnetic force, electrostatic force, spring force, or the like adds a click feeling at a set click timing.

With the above click mechanism, when the first rotating ring 111 rotates by unit angle α or when the second rotating ring 112 rotates by unit angle β, a single click feeling can be provided at a timing at which there is a change amounting to a single pulse in the output signal of the photointerrupter, for example.

Modification Example

The click mechanism may be added to the second embodiment described above. More specifically, the manipulated variable regarding the rotation (the minimum manipulated variable), which makes the focus actuator 123 drive the minimum control amount, is set optionally. Furthermore, a click mechanism that generates a click feeling each time the first rotating ring 111 or the second rotating ring 112 moves by an amount of the set minimum manipulated variable, may be provided in the lens apparatus 110. In the lens apparatus 110 according to the present modification example, since the user can optionally change the minimum manipulated variable, the user can optionally change the timing at which a click feeling is generated. Furthermore, when the rotating ring among the first rotating ring 111 and the second rotating ring 112 that has been added the click feeling is rotated by an amount equivalent to a single click, the focus lens 121 moves in the optical axis direction by an amount equivalent to the minimum moving unit. As a result, the feeling of moving the focus lens 121 is felt by the user in a more readily manner, and a more pleasant focusing operation can be experienced. Furthermore, when the user operates the rotating ring, an integrated feeling between the operation and the feeling can be obtained more readily.

Note that it is only sufficient that the ring to which the click mechanism adds the click feeding is at least either one of the first rotating ring 111 and the second rotating ring 112. However, desirably, there is a click feeling in the ring among the first rotating ring 111 and the second rotating ring 112 that needs a larger manipulated variable regarding the rotation when obtaining at least the same moving amount of the focus lens 121, in other words, desirably, there is a click feeling in the ring for fine adjustment.

Fourth Embodiment

In each of the embodiments described above, a configuration of the lens apparatus 110 including the first rotating ring 111 and the second rotating ring 112 as the two operation portions that have different adjustment amounts of the first optical parameter per unit rotation angle has been described. However, both of the two operation portions do not need to be provided in the lens apparatus 110. In more detail, one of the two operation portions may be provided in the lens apparatus 110, and the other may be provided in the camera body 101. Alternatively, both of the two operation portions may be provided in the camera body 101.

In the present embodiment, the operation dials 104 and 103 illustrated in FIGS. 4A, 4B, and 4C can function as the two operation portions. In other words, the optical apparatus according to the present embodiment is an imaging apparatus including a camera body provided with two operation portions and a lens apparatus. The optical apparatuses in the embodiments described above are the lens apparatus 110. In the present embodiment, the adjustment amount of the first optical parameter per unit rotation angle of the first operation dial 104, and the adjustment amount of the first optical parameter per unit rotation angle of the second operation dial 103 are different from each other.

In more detail, the adjustment amount of the first optical parameter per unit rotation angle of the second operation dial 103 is larger than the adjustment amount of the first optical parameter per unit rotation angle of the first operation dial 104. The relationship between the sizes of the adjustment amounts may be opposite to the above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-240007 filed Dec. 14, 2017, which is hereby incorporated by reference herein in its entirety.

What is claimed is:

1. An optical apparatus comprising:
   a first operation portion operable to adjust a first optical parameter; and
   a second operation portion operable to adjust the first optical parameter and a second optical parameter different from the first optical parameter, wherein
   an adjustment amount of the first optical parameter per a unit rotation angle of the first operation portion and an adjustment amount of the first optical parameter per a unit rotation angle of the second operation portion are different from each other,
   wherein,
   the optical apparatus is a lens apparatus including a lens barrel and an image forming optical system provided inside the lens barrel,
   the first operation portion is a first operation ring provided on an outer circumference of the lens barrel,
   the second operation portion is a second operation ring provided on the outer circumference of the lens barrel,
   the adjustment amount of the first optical parameter per the unit rotation angle of the first operation ring is larger than the adjustment amount of the first optical parameter per the unit rotation angle of the second operation ring, and
   in an optical axis direction of the image forming optical system, the first operation ring is provided on an object side with respect to the second operation ring.

2. The optical apparatus according to claim 1, wherein the first operation portion is operable to adjust only the first optical parameter.

3. The optical apparatus according to claim 1, wherein the first operation portion is operable to adjust an optical parameter different from the first optical parameter.

4. The optical apparatus according to claim 1, wherein, at least one of outer diameters, thicknesses, shapes, surface colors, and materials of the first operation portion and the second operation portion are different from each other.

5. The optical apparatus according to claim 1, wherein the adjustment amount of the first optical parameter per the unit rotation angle of the first operation portion and the adjustment amount of the first optical parameter per the unit rotation angle of the second operation portion are changeable.

6. The optical apparatus according to claim 1, further comprising:
   a click mechanism that generates a click feeling in at least either one of the first operation portion and the second operation portion.

7. The optical apparatus according to claim 6, wherein a timing at which the click feeling is generated with the click mechanism is changeable.

8. The optical apparatus according to claim 1, wherein the first optical parameter and the second optical parameter are either a position of a zoom lens unit, a position of a focus lens unit, or an aperture diameter of an aperture unit.

9. The optical apparatus according to claim 1, further comprising:
   a detection portion that detects an amount of rotation of the first operation portion and an amount of rotation of the second operation portion, wherein each of the first operation portion and the second operation portion is an electronic operation ring.

10. The optical apparatus according to claim 1, wherein the optical apparatus is a lens apparatus mountable on a body portion that supports an image pickup element.

11. An optical apparatus comprising:
a first operation portion operable to adjust a first optical parameter;
a second operation portion operable to adjust the first optical parameter and a second optical parameter different from the first optical parameter;
a lens apparatus including a lens barrel and an image forming optical system provided inside the lens barrel; and
a body portion supporting the lens apparatus,
wherein
an adjustment amount of the first optical parameter per a unit rotation angle of the first operation portion and an adjustment amount of the first optical parameter per the unit rotation angle of the second operation portion are different from each other,
the first operation portion is an operation ring provided on an outer circumference of the lens barrel,
the second operation control portion is an operation dial provided in the body portion, and
the adjustment amount of the first optical parameter per the unit rotation angle of the operation ring is smaller than the adjustment amount of the first optical parameter per the unit rotation angle of the operation dial.

12. An optical apparatus comprising:
a first operation portion operable to adjust a first optical parameter;
a second operation portion operable to adjust the first optical parameter and a second optical parameter different from the first optical parameter,
a lens apparatus including a lens barrel and an image forming optical system provided inside the lens barrel; and
a body portion supporting the lens apparatus,
wherein
an adjustment amount of the first optical parameter per a unit rotation angle of the first operation portion and an adjustment amount of the first optical parameter per a unit rotation angle of the second operation portion are different from each other,
the first operation portion is a first operation dial provided in the body portion,
the second operation portion is a second operation dial provided in the body portion, and
the adjustment amount of the first optical parameter per the unit rotation angle of the first operation dial is smaller than the adjustment amount of the first optical parameter per the unit rotation angle of the second operation dial.

* * * * *